United States Patent
Furumoto

(10) Patent No.: US 8,442,383 B2
(45) Date of Patent: May 14, 2013

(54) MOVING IMAGE PLAYBACK SYSTEM AND IMAGE CAPTURING APPARATUS

(75) Inventor: Yoshihisa Furumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 13/206,670

(22) Filed: Aug. 10, 2011

(65) Prior Publication Data

US 2012/0051712 A1 Mar. 1, 2012

(30) Foreign Application Priority Data

Aug. 30, 2010 (JP) ................................. 2010-192502
May 27, 2011 (JP) ................................. 2011-119357

(51) Int. Cl.
*H04N 9/80* (2006.01)
*H04N 5/935* (2006.01)
*H04N 5/77* (2006.01)
*H04N 13/02* (2006.01)
*H04N 7/18* (2006.01)
*H04N 9/475* (2006.01)
*H04N 5/232* (2006.01)
*A61B 1/04* (2006.01)

(52) U.S. Cl.
USPC ........... 386/248; 386/210; 386/223; 386/224; 386/225; 386/226; 386/227; 386/242; 348/47; 348/48; 348/49; 348/50; 348/64; 348/73; 348/139; 348/142; 348/513; 348/346

(58) Field of Classification Search .................. 386/210, 386/223, 224, 225, 226, 227, 242, 248; 348/47, 348/48, 49, 50, 64, 73, 139, 142, 513, 346
See application file for complete search history.

(56) References Cited

U.S. PATENT DOCUMENTS

| | | | | |
|---|---|---|---|---|
| 7,847,828 B2 * | 12/2010 | Kita et al. | ................. | 348/220.1 |
| 2003/0146981 A1 * | 8/2003 | Bean et al. | ................. | 348/222.1 |
| 2005/0052553 A1 * | 3/2005 | Kido et al. | .................... | 348/296 |
| 2008/0273094 A1 * | 11/2008 | Kunieda | .................... | 348/220.1 |

FOREIGN PATENT DOCUMENTS

| | | |
|---|---|---|
| JP | 2005-318548 A | 11/2005 |
| JP | 2007-202050 | 8/2007 |
| JP | 2008-193342 A | 8/2008 |

OTHER PUBLICATIONS

The above references were cited in a Oct. 2, 2012 Japanese Office Action, a copy of which is enclosed without an English Translation, that issued in Japanese Patent Application No. 2001-119357.

* cited by examiner

*Primary Examiner* — Daquan Zhao
(74) *Attorney, Agent, or Firm* — Cowan, Liebowitz & Latman, P.C.

(57) ABSTRACT

An image capturing apparatus selects one of image capturing conditions to be used for capturing images as a reference condition when a total of image capturing time of one frame in each image capturing condition to be used for capturing images is longer than one frame period at a predetermined frame rate, and captures images at the predetermined frame rate under the reference condition, and captures images at a frame rate lower than the predetermined frame rate under the other image capturing conditions. A playback apparatus detects a motion between frames of a moving image captured under the reference condition when the image capturing condition of the playback moving image is not the reference condition, and generates an interpolation frame for interpolating between frames of the playback moving image based on the detected motion.

12 Claims, 16 Drawing Sheets

IMAGE CAPTURING APPARATUS

FIG. 6

| IMAGE CAPTURING CONDITION | 1 | 2 | 3 | 4 | 5 | 6 |
|---|---|---|---|---|---|---|
| IMAGE CAPTURING TIME (ms) | 7 | 7 | 7 | 7 | 7 | 7 |
| LEVEL | 2 | 5 | 1 | 3 | 0 | 4 |

FIG. 11

| IMAGE CAPTURING CONDITION | 1 | 2 | 3 | 4 | 5 | 6 | FORCED CONDITION |
|---|---|---|---|---|---|---|---|
| IMAGE CAPTURING TIME (ms) | 7 | 7 | 7 | 7 | 7 | 7 | 7 |
| LEVEL | 2 | 5 | 1 | 3 | 0 | 4 | 6 |

IMAGE CAPTURING APPARATUS

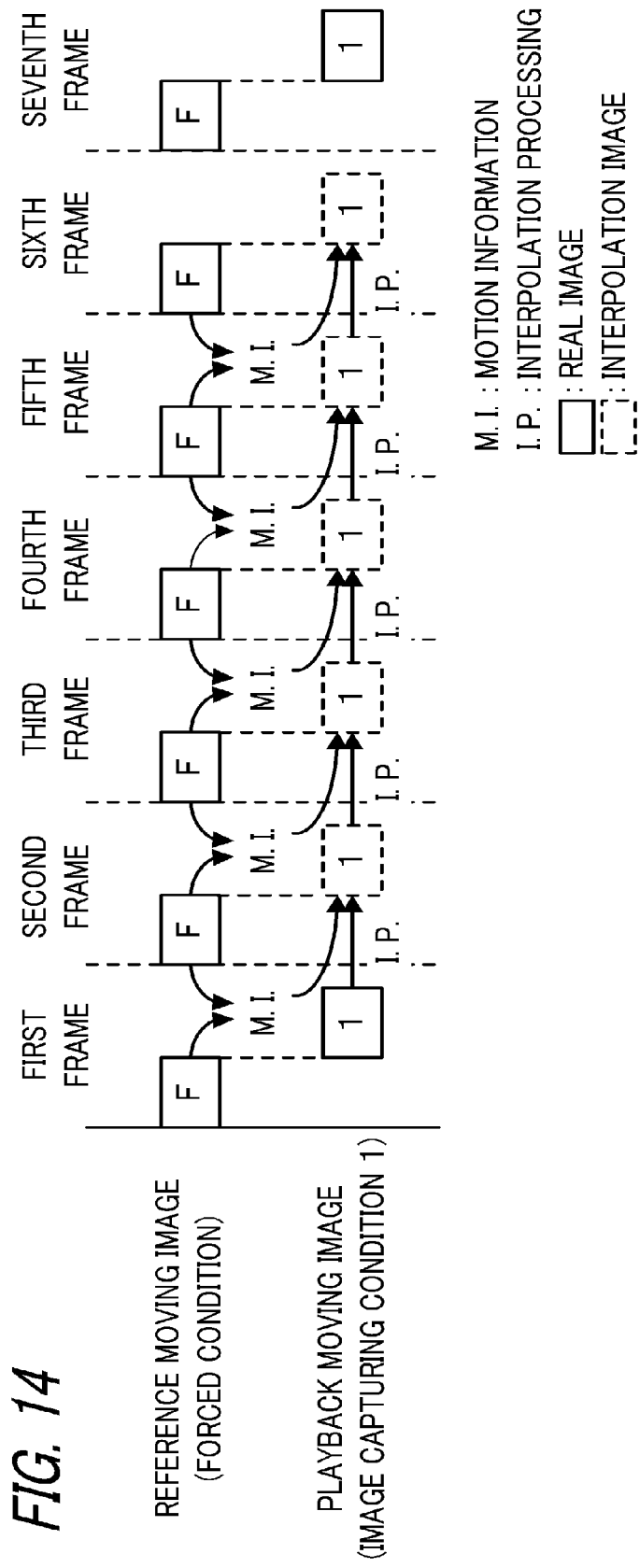

MOVING IMAGE PLAYBACK SYSTEM AND IMAGE CAPTURING APPARATUS

BACKGROUND OF THE INVENTION

1. Field of the Invention

The present invention relates to a moving image playback system and an image capturing apparatus.

2. Description of the Related Art

A bracket image capturing function, which captures images a plurality of times with switching image capturing conditions, including exposure and focus, so that the user can select a desired image out of the plurality of obtained images, is known. In the case of obtaining still images under each image capturing condition using the bracket image capturing function, total image capturing time (total of image capturing time under each image capturing condition) need not be considered. In the case of obtaining moving images under each image capturing condition using the bracket image capturing function, however, the total image capturing time (total of image capturing time for one frame under each image capturing condition) must not exceed one frame period, since images are captured under a plurality of image capturing conditions for each frame.

Technique on the bracket image capturing function is disclosed, for example, in Japanese Patent Application Laid-Open No. 2007-202050. In concrete terms, Japanese Patent Application Laid-Open No. 2007-202050 discloses a technique for aligning positions of an object in two frames by motion correction and combining the two frames. According to the technique disclosed in Japanese Patent Application Laid-Open No. 2007-202050, a plurality of still images, in which positions of the object are the same but brightness values are different, can be obtained.

SUMMARY OF THE INVENTION

The technique disclosed in Japanese Patent Application Laid-Open No. 2007-202050, however, can be applied only for brightness, and cannot be adapted to conditions other than brightness, such as focus and ISO sensitivity.

Furthermore, if there are many image capturing conditions when a moving image is captured using the bracket image capturing function, the total image capturing time (7 ms×6=42 ms) exceeds one frame period (16 ms), as shown in FIG. 2. In this case, the total image capturing time can be decreased to be less than the one frame period if the number of image capturing conditions is limited, as shown in FIG. 8. However in the case of such a configuration, images cannot be captured under other image capturing conditions desired by the user. If images are captured without restricting the number of image capturing conditions, on the other hand, the frame rate of moving images under each image capturing condition drops, as shown in FIG. 9. In this case, the frame rate can be maintained if interpolation frames are generated based on the movement between frames. But as FIG. 10 shows, frames used for detecting motion (frames used for the interpolation processing) are apart from each other in terms of time, hence a motion detection error, deterioration of image quality of the interpolation frames due to this detection error, or deterioration of the image quality of the moving images, may occur.

The present invention provides a technique which can play back a plurality of moving images, captured in parallel under a plurality of mutually different image capturing conditions, at a predetermined frame rate, with suppressing deterioration of image quality.

The present invention its first aspect provide a moving image playback system comprising: an image capturing apparatus that can capture, at a predetermined frame rate, a plurality of moving images under mutually different image capturing conditions in parallel in use of one image capturing element; and a playback apparatus that plays back moving images captured by the image capturing apparatus, wherein the image capturing apparatus comprises:

a reference condition selection unit that selects one of the plurality of image capturing conditions to be used for capturing images as a reference condition when a total of image capturing time of one frame in each image capturing condition to be used for capturing images is longer than one frame period at the predetermined frame rate; and an image capturing control unit that captures images at the predetermined frame rate under the reference condition, out of the plurality of image capturing conditions, and captures images at a frame rate lower than the predetermined frame rate under the other image capturing conditions, out of the plurality of image capturing conditions, and the playback apparatus comprises:

a playback moving image selection unit that causes a user to select a playback moving image, which is a moving image to be played back, out of a plurality of moving images captured by the image capturing apparatus;

a detection unit that detects a motion between frames of a moving image captured under the reference condition when the image capturing condition of the playback moving image is an image capturing condition other than the reference condition; and a conversion unit that converts the frame rate of the playback moving image into the predetermined frame rate by generating an interpolation frame for interpolating between frames of the playback moving image based on the motion detected by the detection unit when the image capturing condition of the playback moving image is an image capturing condition other than the reference condition.

The present invention its second aspect provide an image capturing apparatus that can capture at a predetermined frame rate a plurality of moving images under mutually different image capturing conditions in parallel in use of one image capturing element, the image capturing apparatus comprising:

a reference condition selection unit that selects one of a plurality of image capturing conditions to be used for capturing images as a reference condition when a total of image capturing time of one frame in each image capturing condition to be used for capturing images is longer than one frame period at the predetermined frame rate;

an image capturing control unit that captures images at the predetermined frame rate under the reference condition, out of the plurality of image capturing conditions, and captures images at a frame rate lower than the predetermined frame rate under the other image capturing conditions, out of the plurality of image capturing conditions; and a storage unit that stores a plurality of moving images captured by the image capturing control unit.

According to the present invention, a plurality of moving images, captured in parallel under a plurality of mutually different image capturing conditions, can be played back at a predetermined frame rate, with suppressing deterioration of image quality.

Further features of the present invention will become apparent from the following description of exemplary embodiments with reference to the attached drawings.

BRIEF DESCRIPTION OF THE DRAWINGS

FIG. 6 is a table showing an example of levels to indicate the image capturing time and detection accuracy of motion under each image capturing condition;

FIG. 11 is a table showing an example of levels to indicate the image capturing time and detection accuracy of motion under each image capturing condition;

FIG. 14 is a diagram depicting an example of a method for playing back moving images according to Example 2.

DESCRIPTION OF THE EMBODIMENTS

Example 1

A moving image playback system according to Example 1 of the present invention will now be described. The moving image playback system according to this example has an image capturing apparatus that can capture a plurality of moving images under mutually different image capturing conditions at a predetermined frame rate, using one image capturing element (imaging sensor), and a playback apparatus that plays back moving images captured by the image capturing apparatus. In the case of this example, the image capturing apparatus and the playback apparatus are different apparatuses, but the image capturing apparatus may further has the function of the playback apparatus, as in the case of a video camera having a playback function.

Figure 3:
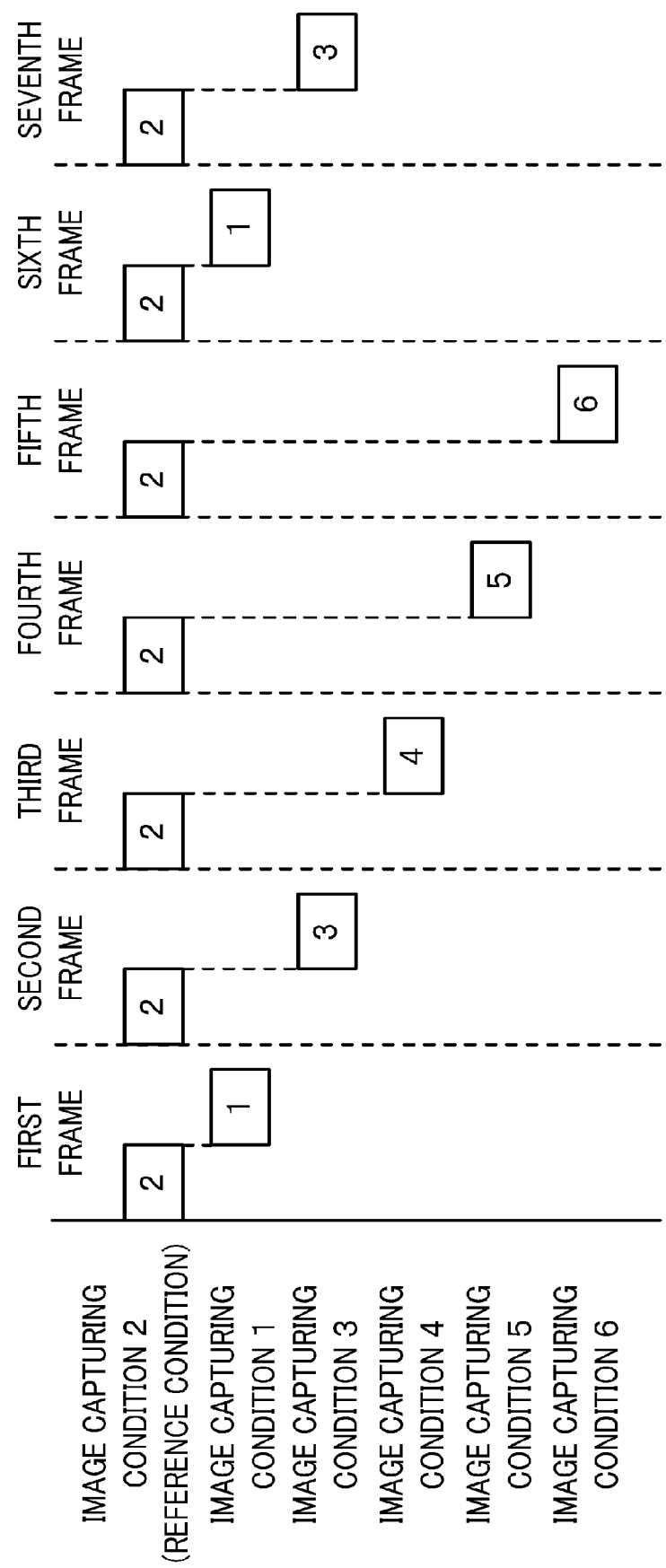
FIG. 3 is a diagram depicting an example of the image capturing sequence of Example 1.

The image capturing apparatus according to this example generates moving images under each image capturing condition by capturing images under a plurality of image capturing conditions desired by the user. In concrete terms, as FIG. 3 shows, the image capturing apparatus selects one of the plurality of image capturing conditions used for capturing images as a reference condition if the total of the image capturing time of one frame in each image capturing condition used for capturing images is longer than one frame period of a predetermined frame rate. Out of the plurality of image capturing conditions, images are captured at the predetermined frame rate under the reference condition, and images are captured with skipping frames (at a frame rate lower than the predetermined frame rate) under the other image capturing conditions. Assumed image capturing conditions are, for example: brightness, focus, ISO sensitivity, angle of view (e.g. zoom, wide angle), image quality (e.g. high image quality, standard image quality, low image quality), resolution (e.g. high resolution, standard resolution, low resolution), image capturing mode (e.g. portrait mode, sports mode, night view mode), white balance (e.g. color temperature at amber side, reference color temperature, color temperature at magenta side), and flash (e.g. high quantity of light, reference quantity of light, low quantity of light). Possible reference conditions are, for example: an image capturing condition with which ISO sensitivity is lowest, image capturing condition with which angle of view is widest, image capturing condition with which image quality is highest, image capturing condition with which resolution is highest, and image capturing condition of the reference color temperature or reference quantity of light. The reference condition may be specified by the user arbitrarily, or may be automatically determined by the image capturing apparatus.

Figure 5:
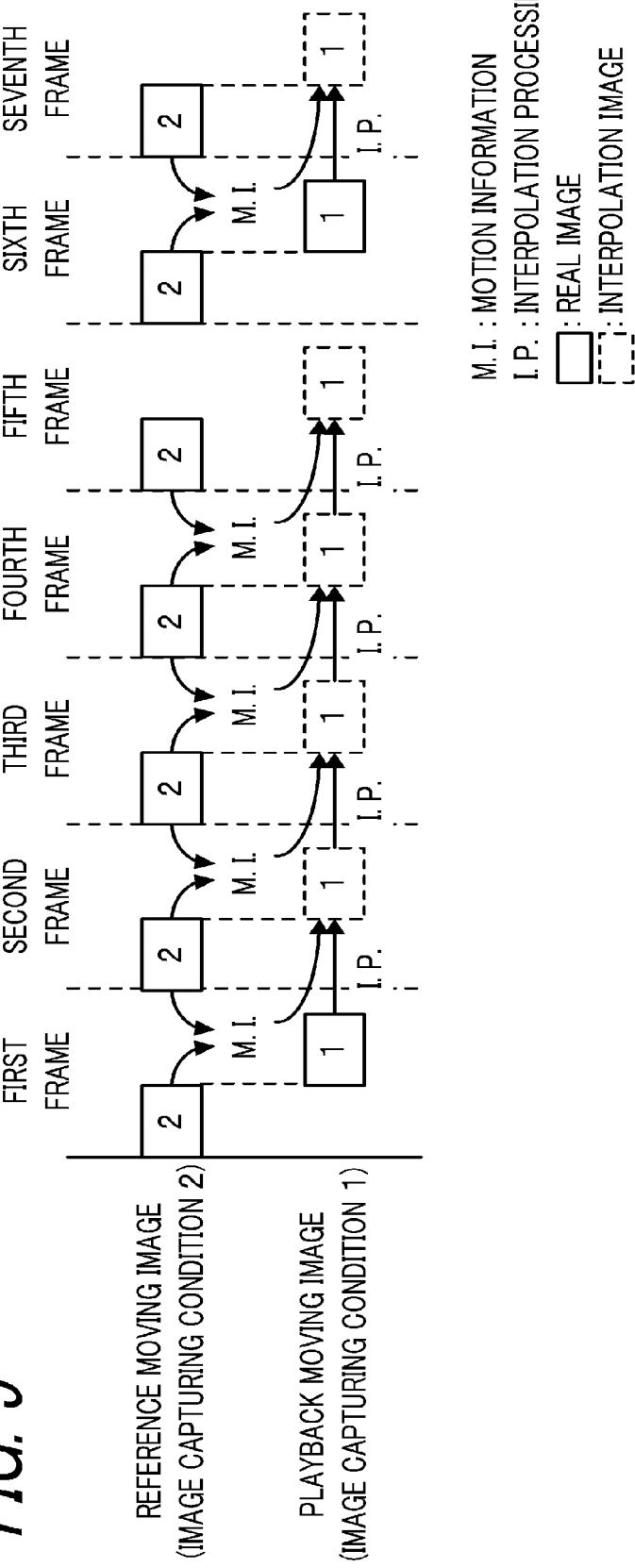
FIG. 5 is a diagram depicting an example of a method for playing back moving images according to Example 1.

As FIG. 5 shows, the playback apparatus according to this example detects a motion between the frames of a moving image captured under the reference condition if the image capturing condition of the moving image to be played back (playback moving image), out of the plurality of moving images captured by the image capturing apparatus, is an image capturing condition other than the reference condition. Then by generating an interpolation frame for interpolating between the frames of the playback moving image based on the detected motion, the playback apparatus converts the frame rate of the playback moving image into the predetermined frame rate. Thereby the moving image under the image capturing condition desired by the user can be played back at the predetermined frame rate. Since the moving image under the reference condition is a moving image at the predetermined frame rate, motion can be accurately detected from this moving image. Therefore a moving image, of which image quality of the interpolation frames is not deteriorated much due to a motion detection error, can be obtained.

Figure 1A:
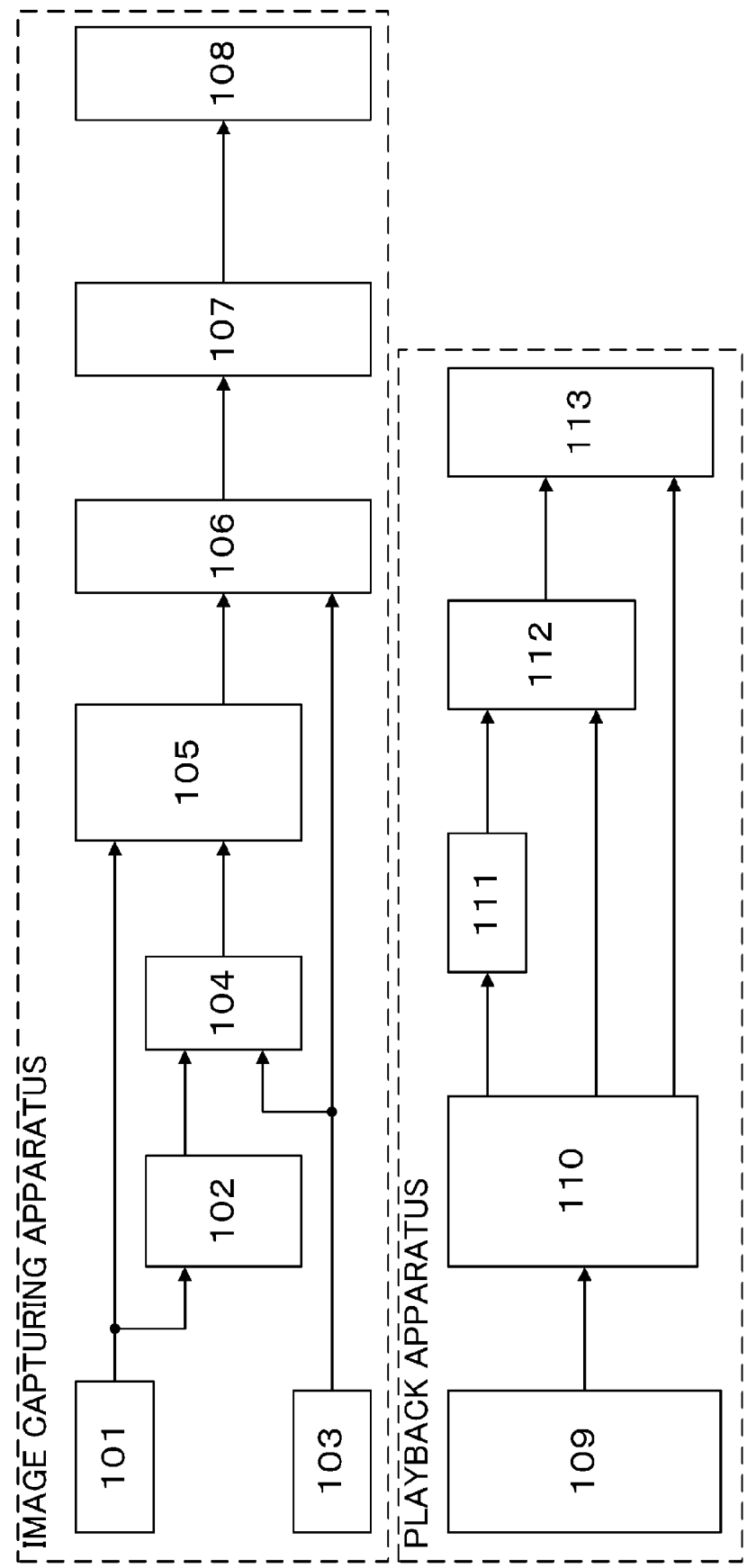
FIG. 1A is a block diagram depicting an example of the functional configurations of an image capturing apparatus and a playback apparatus according to Example 1.
Figure 1B:
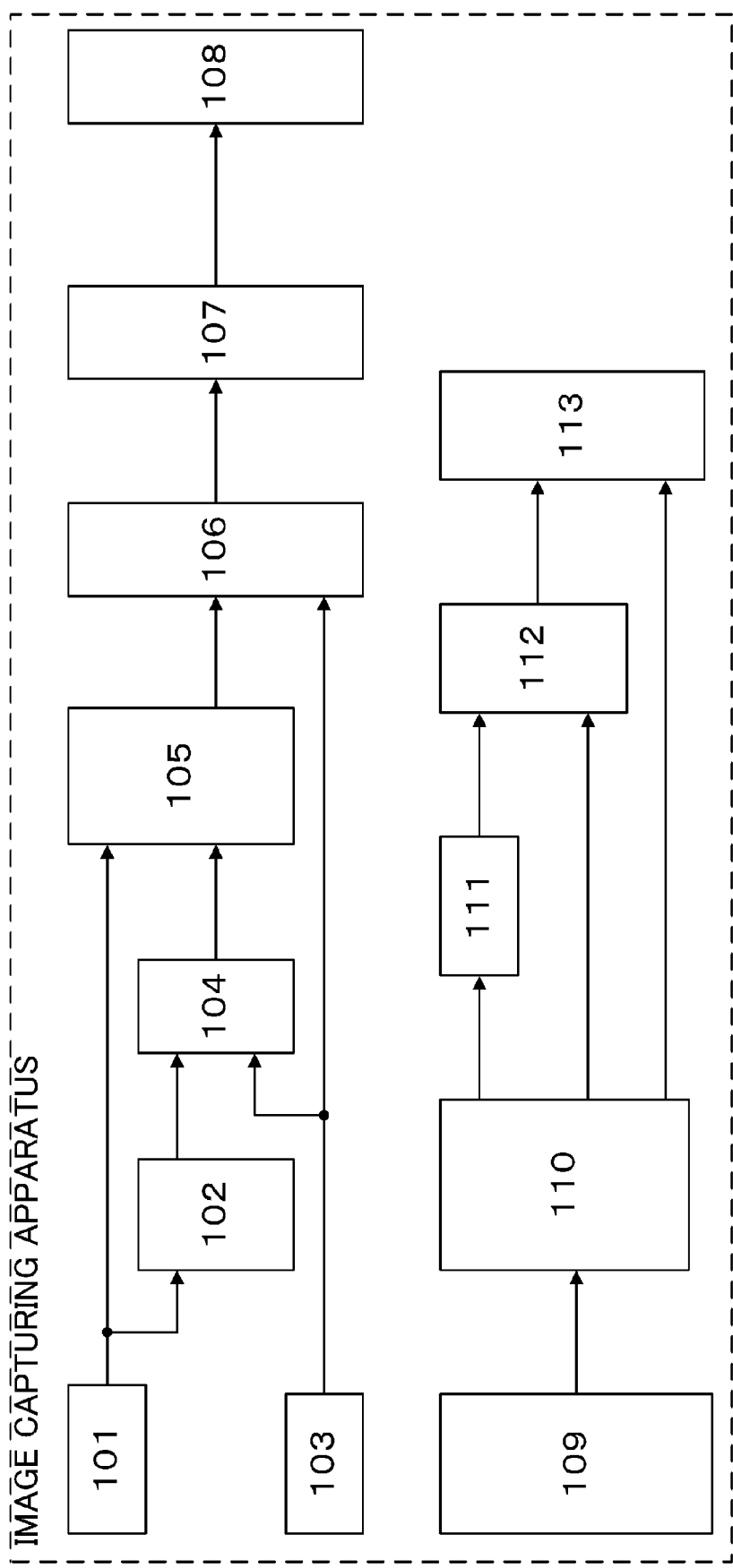
FIG. 1B is a block diagram depicting a configuration example of an image capturing apparatus which further has a function of the playback apparatus.

FIG. 1A is a block diagram depicting an example of a functional configuration of an image capturing apparatus and a playback apparatus according to this example. FIG. 1B is a block diagram depicting a configuration example of an image capturing apparatus which further has a function of the playback apparatus.

(Image capturing apparatus)

Figure 4:
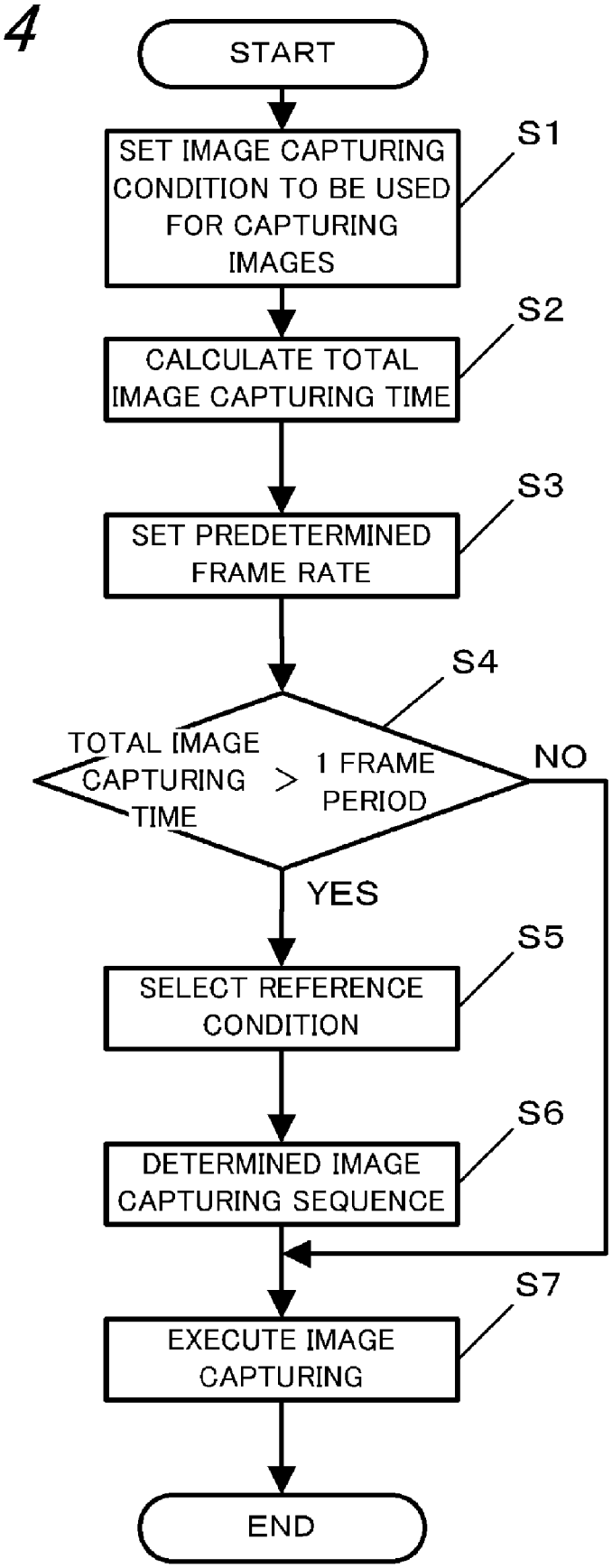
FIG. 4 is a flow chart depicting a processing flow by the image capturing apparatus.

A processing flow by the image capturing apparatus will now be described with reference to the flow chart in FIG. 4.

Figure 2:
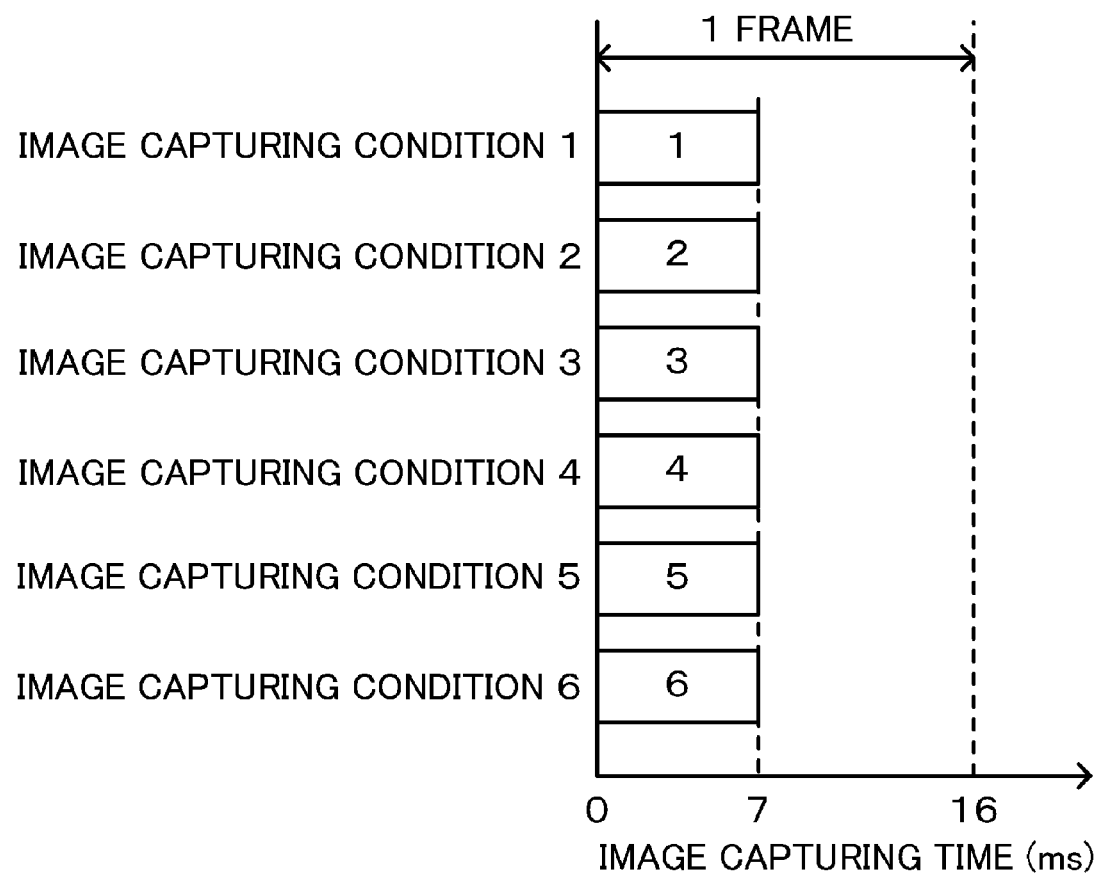
FIG. 2 is a diagram depicting an example of image capturing time of each image capturing condition and one frame period.

In the case of capturing a plurality of moving images under mutually different image capturing conditions in parallel using one image capturing element (bracket image capturing), an image capturing condition setting unit 101 sets an image capturing condition selected by the user (image capturing condition to be used for capturing images), out of a plurality of image capturing conditions that can be set by the image capturing apparatus (S1). In this example, it is assumed that the six image capturing conditions 1 to 6 shown in FIG. 2 and FIG. 6, are set. The number of image capturing conditions is not limited to six. The number of image capturing conditions can be smaller than six or greater than six. The image capturing condition used for capturing images may be predetermined by a manufacturer, instead of being selected by the user.

The image capturing condition setting unit 101 outputs the setting image capturing condition information to indicate the image capturing conditions 1 to 6 being set to a total image capturing time calculation unit 102 and a reference condition selection unit 105.

Based on the setting image capturing condition information, the total image capturing time calculation unit 102 calculates the total of image capturing time of one frame of each image capturing condition used for capturing images as the total image capturing time (S2). Then the total image capturing time calculation unit 102 outputs the total image capturing time information which indicates the total image capturing time to an image capturing time determination unit 104. Since each image capturing time of one frame under the image capturing conditions 1 to 6 is 7 ms respectively in this example, as shown in FIG. 6, the total image capturing time is 42 ms.

A frame rate setting unit 103 sets a frame rate during capturing a moving image (the predetermined frame rate), and outputs the frame rate information which indicates the frame rate which is set (setting frame rate) to the image capturing time determination unit 104 and an image capturing sequence management unit 106 (S3). In this example, it is assumed that one frame period of the setting frame is 16 ms (setting frame rate: 60 fps). The setting frame rate is not limited to this. One frame period of the setting frame rate may be longer or shorter than 16 ms. For example, one frame period in the case of the setting frame rate 30 fps is 33 ms, and one frame period in the case of the setting frame rate 120 fps is 8 ms. The setting frame rate may be set according to the user operation, or may be set in advance by the manufacturer. The setting frame rate is, for example, a maximum frame rate which the image capturing apparatus can capture (maximum frame rate which is determined depending on the bracket image capturing processing capability of the image capturing apparatus). In this example, in a capturing of only one moving image, the image capturing apparatus can capture at a high frame rate of 120 fps. And, in a capturing of a plurality of moving images using the bracket image capturing function, the image capturing apparatus sets a default value of 60 fps as the setting frame rate in advance.

An image capturing time determination unit 104 determines whether or not the total image capturing time is longer than one frame period of the setting frame rate, based on the total image capturing time information and the frame rate information (S4). According to this example, the total image capturing time is 42 ms, and one frame period of the setting frame rate is 16 ms, hence it is determined that the total image capturing time is longer than one frame period of the setting frame rate. The determination result is output to the reference condition selection unit 105 as the image capturing time determination information. In this example, six image capturing conditions are set, but if three or more image capturing conditions are set, the total image capturing time is 21 ms or more, therefore it is determined as being longer than one frame period of the setting frame rate. If only two image capturing conditions are set, the total image capturing time is 14 ms, therefore it is determined as being shorter than one frame period of the setting frame rate.

If the total of image capturing time for one frame under each image capturing condition used for capturing images is longer than one frame period at a predetermined frame rate (S4: YES), the reference condition selection unit 105 selects one of the plurality of image capturing conditions used for capturing images as a reference condition (reference condition selection unit, S5).

In concrete terms, if the total image capturing time is longer than one frame period of the setting frame rate, a reference condition is selected from the image capturing conditions being set (image capturing conditions used for capturing images) using the setting image capturing condition information. According to this example, the reference condition selection unit 105 selects an image capturing condition with which motion between frames can be detected most accurately as a reference condition, out of a plurality of image capturing conditions used for capturing images. Then the reference condition selection unit 105 outputs the reference condition information to indicate the reference condition and non-reference condition information to indicate the other image capturing conditions to the image capturing sequence management unit 106.

If the total image capturing time is equal to or less than one frame period of the setting frame rate (S4: NO), the reference condition selection unit 105 does not select the reference condition, outputs the setting image capturing condition information to the image capturing sequence management unit 106 as the non-reference condition information.

Now an example of a reference condition selection method will be described.

First the reference condition selection unit 105 calculates a one frame period TFRAME of the setting frame rate. For example, the reference condition selection unit 105 obtains the frame rate information from the frame rate setting unit 103, and calculates TFRAME using the frame rate information.

Then the reference condition selection unit 105 selects an image capturing condition with which the image capturing time for one frame is the longest, out of the image capturing conditions that are set, and regards this image capturing time as TMAX.

Then the reference condition selection unit 105 subtracts TMAX from TFRAME, and regards the image capturing conditions having an image capturing times within the time obtained by the subtraction as candidates to be a reference condition. In this example, TFRAME=16 ms, TMAX=7 ms and TFRAME−TMAX=9 ms, therefore the candidates to be a reference condition are the image capturing conditions 1 to 6.

Out of these candidates, the reference condition selection unit 105 selects an image capturing condition with which motion between frames can be detected most accurately (e.g. image capturing condition with which image having clear contours can be obtained, image capturing condition with which blocked up shadows and blown out highlights are hardly generated) as a reference condition. In this example, it is assumed that a level to indicate detection accuracy of motion between frames is predetermined for each image capturing condition, as shown in FIG. 6. The reference condition selection unit 105 sets an image capturing condition with which the level is the highest (the image capturing condition 2 in the case of FIG. 6) as the reference condition.

The image capturing sequence management unit 106 and an image capturing execution unit 107 capture an image at a predetermined frame rate under the reference condition, out of the plurality of image capturing conditions being set, and capture an image at a frame rate lower than the predetermined frame rate, with skipping frames, under the other image capturing conditions, out of the plurality of image capturing conditions being set. In other words, according to this example, the image capturing control unit of the present invention is implemented by the image capturing sequence management unit 106 and the image capturing execution unit 107.

The image capturing sequence management unit 106 determines the image capturing sequence for each frame of the setting frame rate based on the reference condition information, non-reference condition information and frame rate information, and outputs the information to indicate this image capturing sequence to the image capturing execution unit 107 (S6).

An example of a method for managing (a method for determining) an image capturing sequence will now be described.

The image capturing sequence management unit 106 determines the image capturing sequence so that images are captured under the reference condition at the beginning of each frame at the setting frame rate, and images are captured with skipping among frames under the other image capturing conditions. If the sequence of the image capturing conditions other than the reference condition is determined so that the number of image capturing conditions used for capturing images in one frame period is maximized, the number of frames required for capturing images under all the image capturing conditions can be decreased. For example, an image is captured in the sequence from an image capturing condition with which an image capturing time for one frame is longest.

According to this example, as FIG. 3 shows, the image capturing sequence is: the image capturing condition 2 then 1 in the first frame, the image capturing condition 2 then 3 in the second frame, the image capturing condition 2 then 4 in the third frame, the image capturing condition 2 then 5 in the fourth frame, the image capturing condition 2 then 6 in the fifth frame, or the like.

If there is no reference condition information, the image capturing sequence management unit 106 determines image capturing sequence so that image capturing is performed in the same sequence of the image capturing conditions in each frame of the setting frame rate under all the image capturing conditions that are set. For example, the image capturing sequence is determined in a predetermined default sequence, or in a setting sequence of image capturing conditions.

The image capturing execution unit 107 captures images according to the image capturing sequence determined by the image capturing sequence management unit 106 (S7). The image capturing execution unit 107 also records a plurality of captured moving images in a storage unit 108. According to this example, a plurality of captured moving images, information on image capturing conditions of each moving image, and information on the reference condition are associated and stored in the storage unit 108. If the total image capturing time is equal to or less than one frame time of the setting frame rate (S4: NO), then image capturing can be executed in the predetermined default sequence (or setting sequence of image capturing conditions), hence processing in steps S5 to S6 is skipped.

The storage unit 108 is a storage device for storing a plurality of captured moving images, and examples are a magnetic disk, such as a hard disk, an optical disk, such as a DVD, and a storage media (storage device) such as a non-volatile memory (storage unit). The storage unit 108 may be removable or non-removable.

(Playback Apparatus)

A playback moving image selection unit 109 cause the user to select a playback moving image (the image capturing condition thereof in the case of this example), which is a moving image to be played back, out of a plurality of moving images captured by the image capturing apparatus (playback moving image selection unit). Then the playback moving image selection unit 109 outputs playback moving image information, which is information on the image capturing condition of the playback moving image, to a playback instruction unit 110. In this example, a case of playing back a moving image under the image capturing condition 1 will be described.

The playback instruction unit 110 plays back the playback moving image using a motion detection unit 111, a motion compensation processing unit 112 and an image output unit 113.

Figure 7:
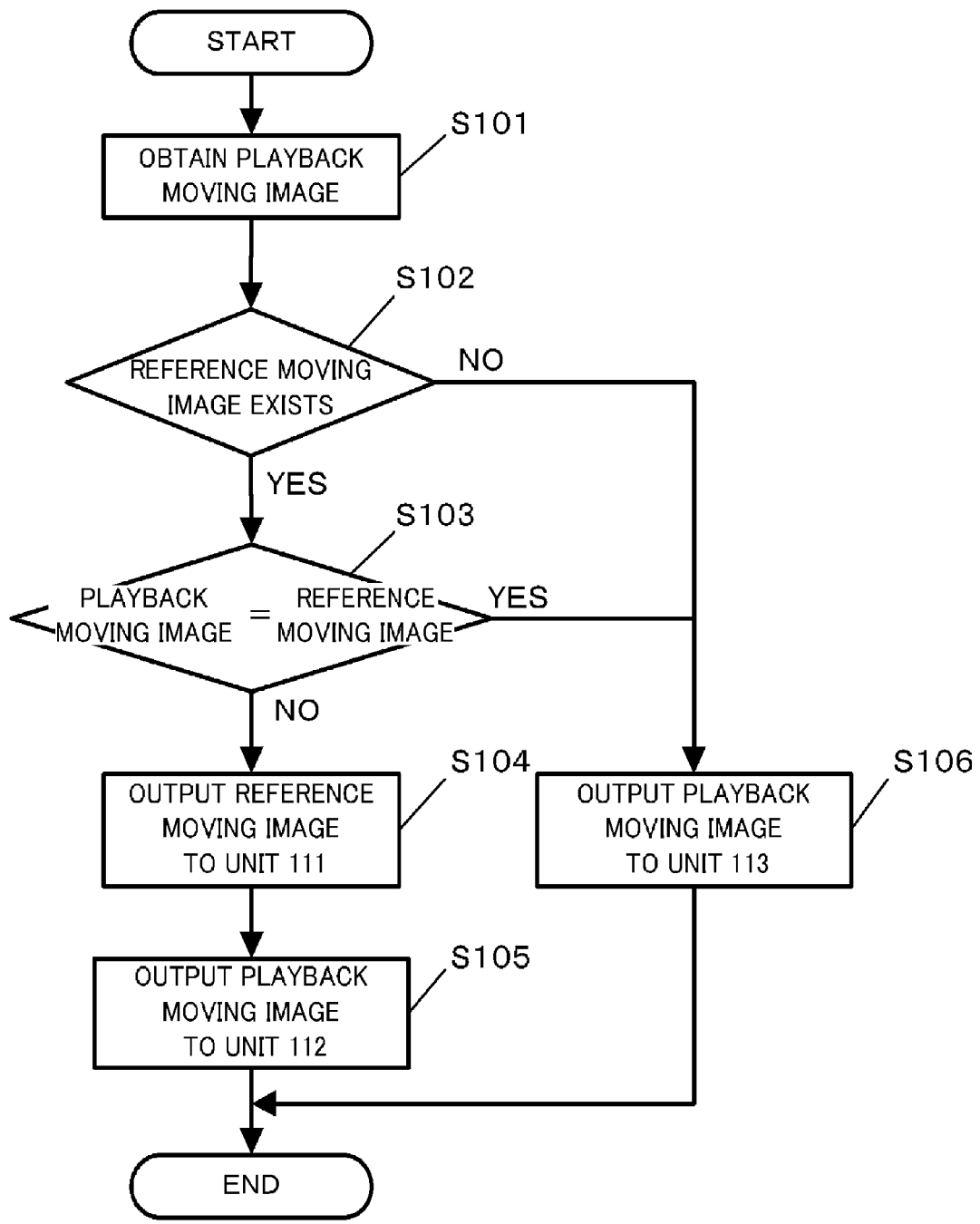
FIG. 7 is a flow chart depicting a processing flow of a playback instruction unit.
Figure 8:
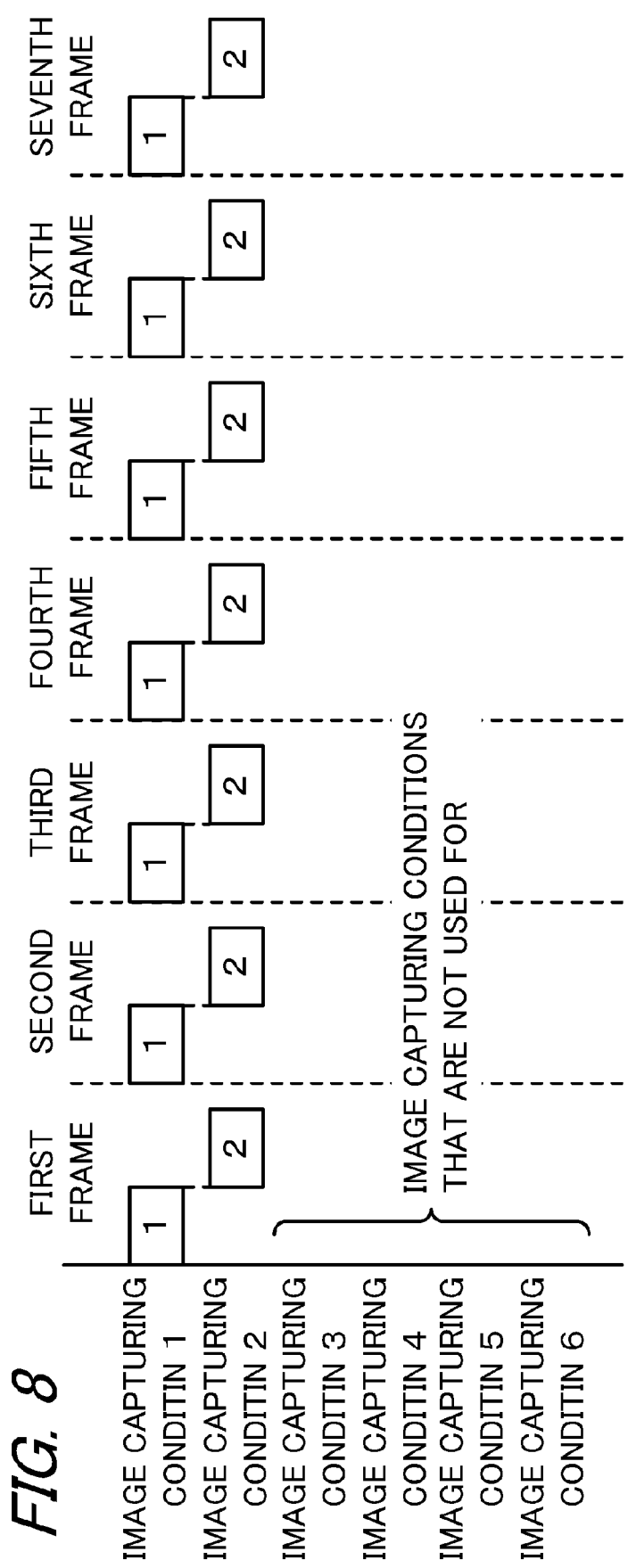
FIG. 8 is a diagram depicting an example of a conventional image capturing sequence.
Figure 9:
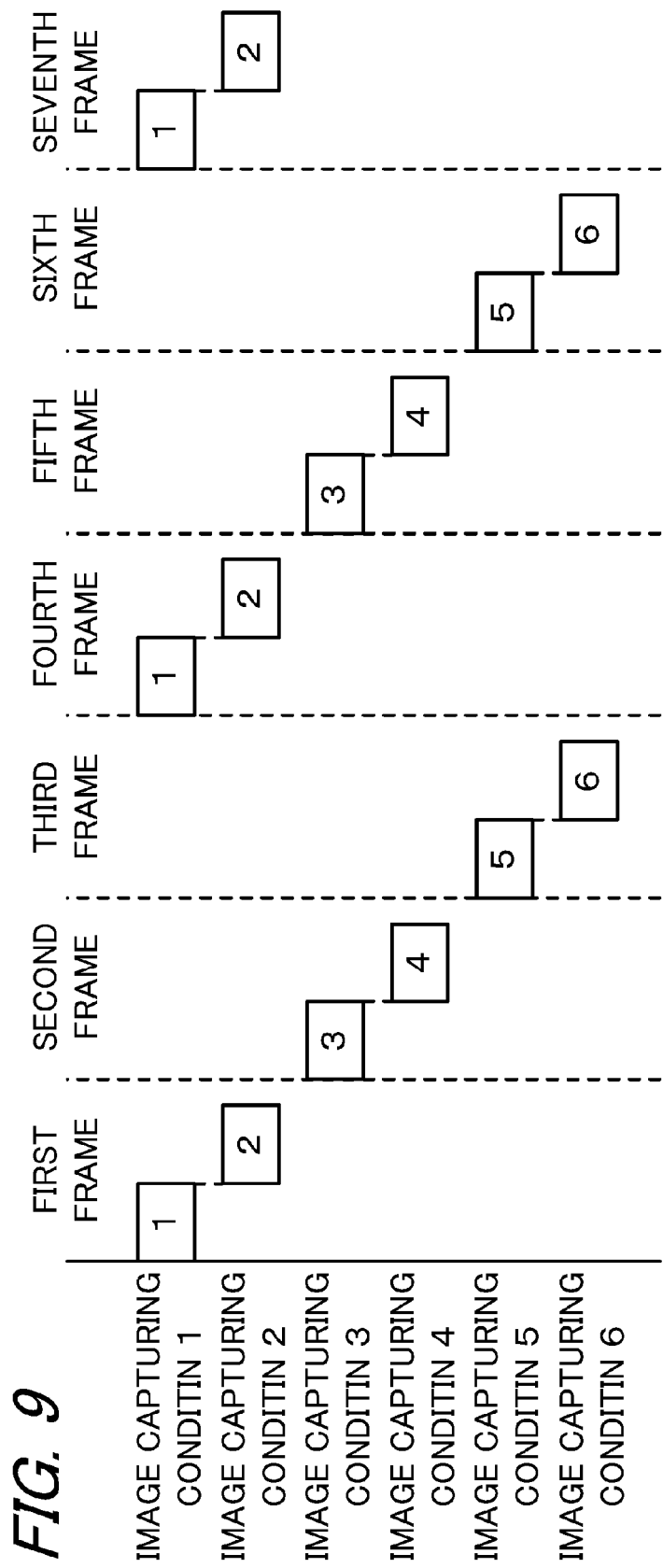
FIG. 9 is a diagram depicting an example of a conventional image capturing sequence.
Figure 10:
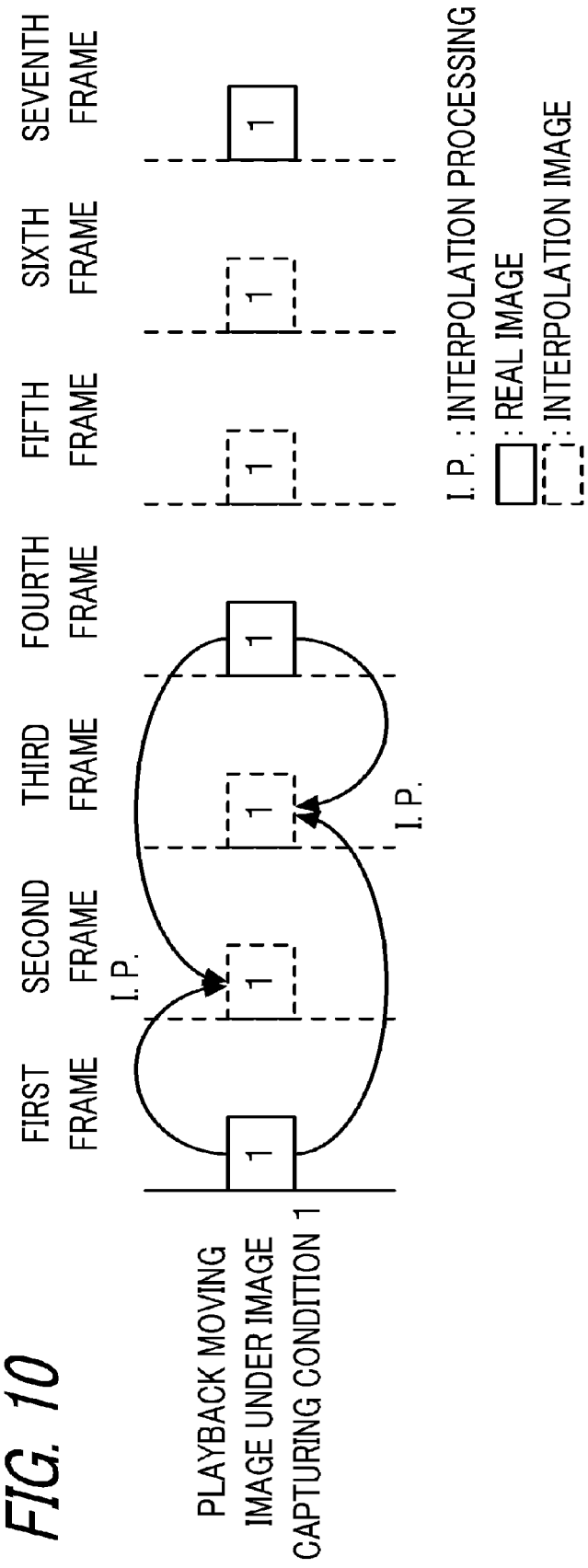
FIG. 10 is a diagram depicting an example of a conventional method for playing back moving images.

Processing by the playback instruction unit 110 will be described with reference to a flow chart in FIG. 7.

First the playback instruction unit 110 obtains a playback moving image, out of the moving images captured by the image capturing apparatus, from the storage unit 108 (S101). In concrete terms, the playback instruction unit obtains the playback moving image based on the playback moving image information.

Then the playback instruction unit 110 determines whether or not a moving image generated under the reference condition (reference moving image) exists in the moving images captured by the image capturing apparatus, based on the information on the reference condition (S102). If the reference moving image does not exist (S102: NO), it means that images are captured under all the selected image capturing conditions in one frame period at the setting frame rate, hence interpolation processing (generation of interpolation frames) is unnecessary. Therefore in such a case, the playback instruction unit 110 outputs the playback moving image to the image output unit 113 (S106). If a reference moving image exists (S102: YES), on the other hand, processing advances to S103.

In S103, the playback instruction unit 110 determines whether or not the image capturing condition of the playback moving image (image capturing condition selected by the playback moving image selection unit 109) is the reference condition based on the information on the reference condition. If the image capturing condition of the playback moving image is the reference condition (S103: YES), the interpolation processing is not required, therefore the processing in S106 is executed. If the image capturing condition of the playback moving image is not the reference condition (S103: NO), processing advances to S104 since interpolation processing is required.

In S104, the playback instruction unit 110 obtains the reference moving image from the storage unit 108, and outputs the reference moving image to the motion detection unit 111.

Then the playback instruction unit 110 outputs the playback moving image to the motion compensation processing unit 112 (S105).

In this example, the moving image generated under the image capturing condition 2 exists in the moving images captured by the image capturing apparatus, as the reference moving image, as shown in FIG. 3, hence YES is determined in S102. Then NO is determined in S103 since the playback moving image is not the reference moving image. Then the moving image generated under the image capturing condition 2 is output to the motion detection unit 111 as the reference moving image (S104), and the moving image generated under the image capturing condition 1 is output to the motion compensation processing unit 112 as the playback moving image (S105).

If the image capturing condition of the playback moving image is an image capturing condition other than the reference condition, the motion detection unit 111 detects motion between frames of the moving image captured under the reference condition. In concrete terms, if the reference moving image is input, the motion detection unit 111 detects motion between frames of the reference moving image, and outputs the detection result to the motion compensation processing unit 112 as the motion information.

If the image capturing condition of the playback moving image is an image capturing condition other than the reference condition, the motion compensation processing unit 112 generates an interpolation frame which interpolates between frames of the playback moving image based on the motion detected by the motion detection unit 111. Thereby the frame rate of the playback moving image is converted into the setting frame rate. In concrete terms, if the playback moving image and the motion information are input, the motion compensation processing unit 112 generates the interpolation moving images by generating an interpolation frame for interpolating between frames of the playback moving images based on the motion information. Then the motion compensation processing unit 112 outputs the generated interpolation moving images to the image output unit 113. In this example, as FIG. 5 shows, the interpolation frame for interpolating between frames of the moving image of the image capturing condition 1 is generated for the moving image of the image capturing condition 1 based on the motion between frames detected from the moving images of the image capturing condition 2. FIG. 5 shows that the frame of the captured image is indicated as a real image, and the interpolation frame is indicated as the interpolation image.

The image output unit 113 outputs the moving image which was input to a display apparatus, which is not illustrated. Thereby the moving image is displayed on the display apparatus.

In this example, a case when the moving image generated under the image capturing condition 1 is a playback moving image was described, but processing the same as the case when the moving image generated under the image capturing condition 1 is the playback moving image is executed even if a moving image generated under one of the image capturing conditions 3 to 6 is the playback moving image. If the moving image generated under the image capturing condition 2 is the playback moving image, the playback moving image is output to the image output unit 113 without the interpolation processing executed (S106). In the case when the moving image generated under the reference condition does not exist in the moving images captured by the image capturing apparatus as well, the playback moving image is output to the image output unit 113 without the interpolation processing executed (S106).

As mentioned above, according to this example, images are captured at a predetermined frame rate under the reference condition, out of the plurality of image capturing conditions used for capturing images, and images are captured with skipping frames under the other image capturing conditions, out of the plurality of image capturing conditions used for capturing images. If the image capturing condition of the playback moving image is an image capturing condition other than the reference condition, an interpolation frame interpolating between frames of the playback moving image is generated based on the motion between frames of the moving image captured under the reference condition, and the frame rate of the playback moving image is converted into a predetermined frame rate. Thereby a plurality of moving images captured in parallel under a plurality of mutually different image capturing conditions can be played back at a predetermined frame rate with suppressing deterioration of the image quality (in concrete terms, deterioration of image quality of the interpolation images).

According to this example, an image capturing condition with which motion between frames can be detected most accurately, out of the plurality of image capturing conditions used for capturing images, is selected as the reference condition, hence deterioration of image quality can be suppressed than the case of using the other image capturing conditions as the reference condition.

The reference condition, however, may be an image capturing condition other than the image capturing condition with which motion between frames can be detected most accurately. If one of the plurality of image capturing conditions used for capturing images can be selected as the reference condition, an effect similar to that of this example can be obtained.

Example 2

A moving image playback system according to Example 2 of the present invention will now be described. In Example 1, an image capturing condition with which motion between frames can be detected most accurately, out of the image capturing conditions selected by the user, is selected as the reference condition. However in some cases, an image capturing condition other than the image capturing condition selected by the user can allow detecting motion between frames more accurately. Hence according to this example, if an image capturing condition, with which motion between frames can be detected more accurately than the image capturing condition selected by the user, exists among the image capturing conditions which were not selected by the user, this image capturing condition is added to the image capturing condition used for capturing images.

The difference from Example 1 of the moving image playback system according to this example will be described in detail.

Figure 12A:
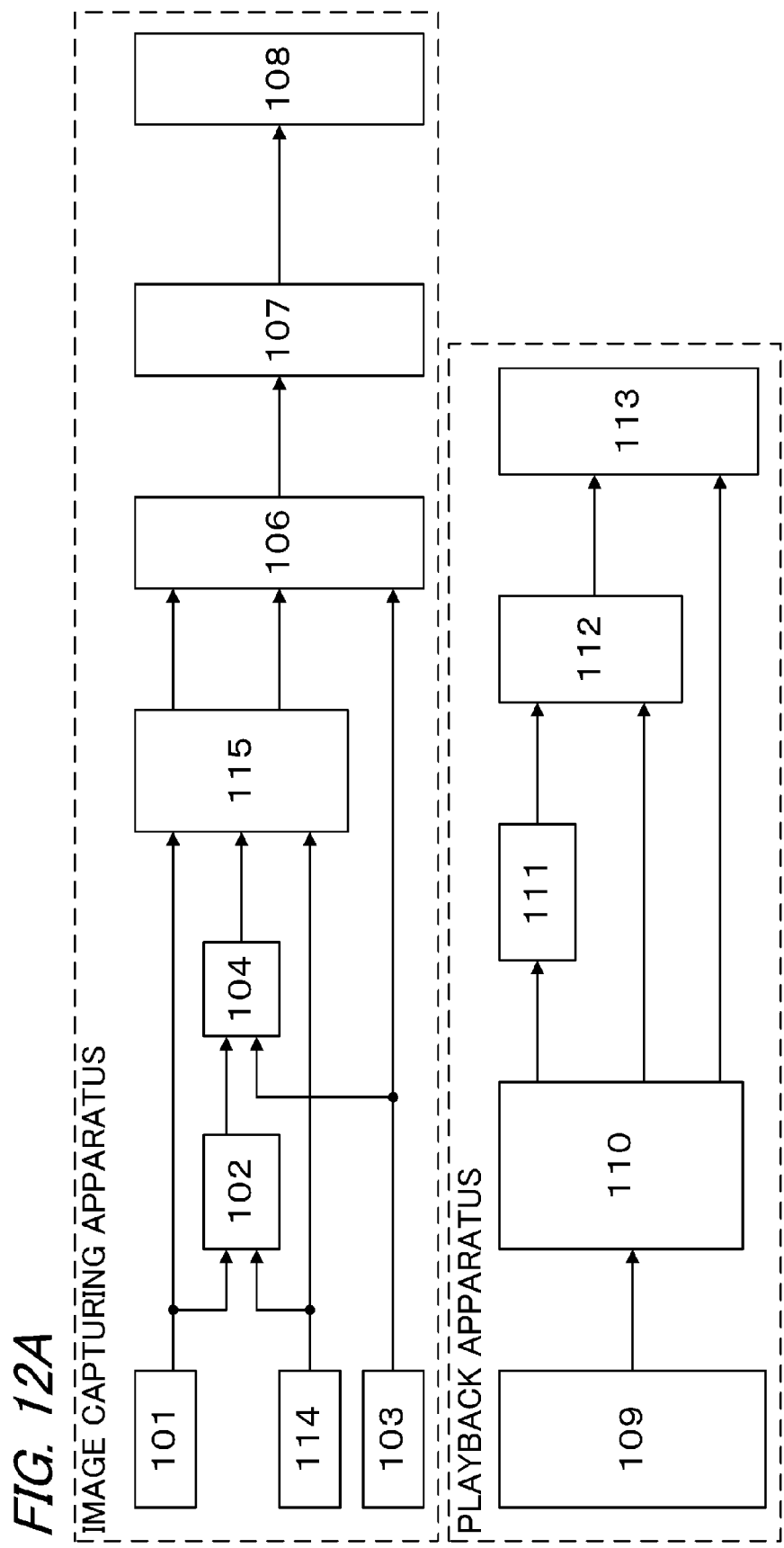
FIG. 12A is a block diagram depicting an example of the functional configuration of an image capturing apparatus and a playback apparatus according to Example 2.
Figure 12B:
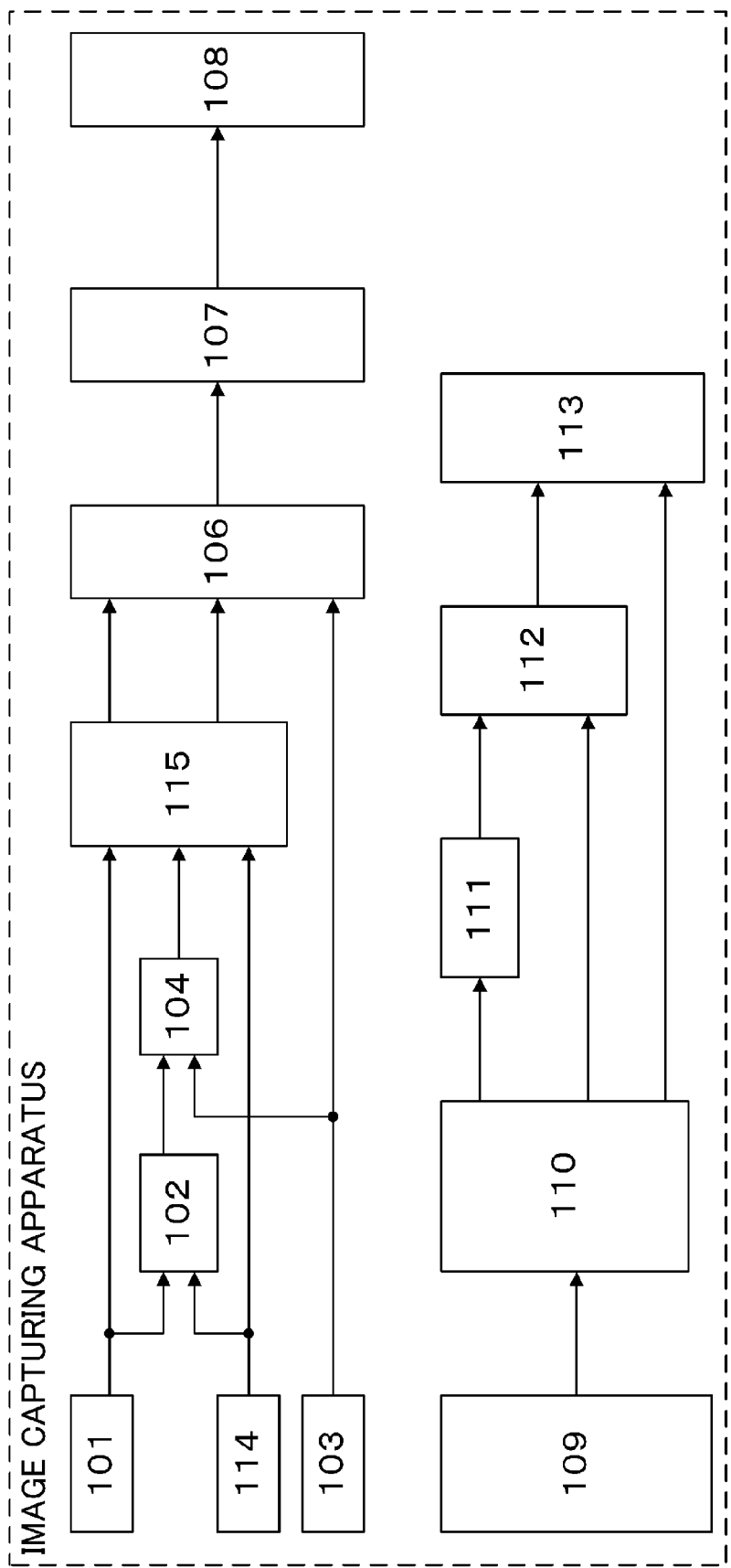
FIG. 12B is a block diagram depicting a configuration example of an image capturing apparatus which further has a function of the playback apparatus.

FIG. 12A is a block diagram depicting an example of a functional configuration of an image capturing apparatus and a playback apparatus according to this example. FIG. 12B is a block diagram depicting a configuration example of an image capturing apparatus which further has a function of the playback apparatus. A function the same as Example 1 is denoted with a same reference number, for which description is omitted. The configuration of the playback apparatus, which is the same as Example 1, is omitted.

A forced condition setting unit 114 determines whether or not an image capturing condition, with which motion between frames can be detected more accurately than the image capturing condition selected by the user, exists among the image capturing conditions which were not selected by the user. If such an image capturing condition exists, the forced condition setting unit 114 adds (sets) this image capturing condition to the image capturing conditions to be used for capturing image (addition unit). In this example, the forced condition setting unit 114 selects and sets an image capturing condition with which the motion between frames can be detected most accurately, out of the plurality of image capturing conditions which can be set by the image capturing apparatus as the forced condition. The forced condition, however, is not limited to this. Any image capturing condition which can detect the motion between frames can be detected more accurately than the image capturing condition selected by the user can be used.

The forced condition setting unit 114 outputs the information on the forced condition to a total image capturing time calculation unit 102 and a reference condition selection unit 115.

A total image capturing time calculation unit 102 calculates the total of image capturing time of one frame under each image capturing condition which was set by the image capturing condition setting unit and the forced condition setting unit 114 as the total image capturing time. In this example, the image capturing conditions 1 to 6 and the forced condition are set as shown in FIG. 11, and the image capturing time of one frame under each image capturing condition is 7 ms, therefore the total image capturing time is 49 ms.

Since the total image capturing time is 49 ms and one frame period of the setting frame rate is 16 ms, the image capturing time determination unit 104 determines that the total image capturing time is longer than the one frame period of the setting frame rate.

A reference condition selection unit 115 selects a reference condition according to the determination result of the image capturing time determination unit 104. In concrete terms, if the total image capturing time is longer than one frame period of the setting frame rate, the reference condition selection unit 115 selects the forced condition as the reference condition. In this example, the total image capturing time is longer than one frame period of the setting frame rate, hence the forced condition is selected as the reference condition. The other processing by the reference condition selection unit 115, which is the same as Example 1, is omitted.

Figure 13:
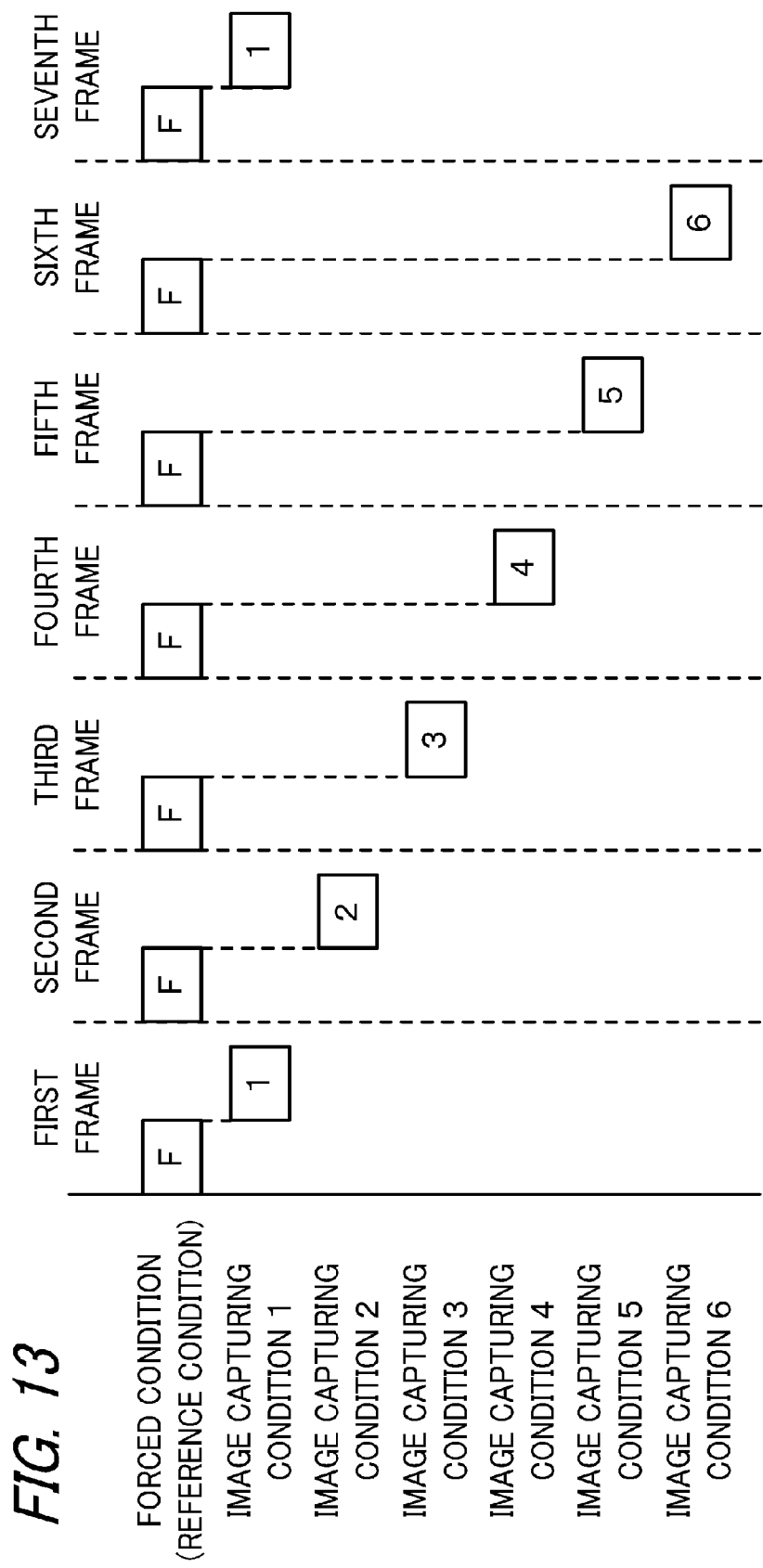
FIG. 13 is a diagram depicting an example of the image capturing sequence of Example 2.

In an image capturing sequence management unit 106 and image capturing execution unit 107, processing the same as Example 1 is performed. As a result, according to this example, images are captured in the image capturing sequence shown in FIG. 13. In concrete terms, under the forced condition, images are captured at a predetermined frame rate, and under the image capturing conditions 1 to 6, images are captured with skipping frames.

If a moving image generated under the image capturing condition 1 is selected as a playback moving image, the motion between frames is detected from the moving image under the forced condition, as shown in FIG. 14. Based on this detection result, interpolation processing is performed on the moving image generated under the image capturing condition 1, and an interpolation moving image is generated.

As described above, according to this example, if an image capturing condition with which motion between frames can be detected more accurately than the image capturing condition selected by the user exists among the image capturing conditions which were not selected by the user, this image capturing condition is added to the image capturing conditions to be used for capturing images. Therefore by using such an image capturing condition as the reference condition, deterioration of image quality can be suppressed even more than Example 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-192502, filed on Aug. 30, 2010, and Japanese Patent Application No. 2011-119357, filed on May 27, 2011, which are hereby incorporated by reference herein in their entirety.

What is claimed is:

1. A moving image playback system comprising: an image capturing apparatus that can capture, at a predetermined frame rate, a plurality of moving images under mutually different image capturing conditions in parallel in use of one image capturing element; and a playback apparatus that played back moving images captured by the image capturing apparatus, wherein the image capturing apparatus comprises:
a reference condition selection unit that selects one of the plurality of image capturing conditions to be used for capturing images as a reference condition when a total of image capturing time of one frame in each image capturing condition to be used for capturing images is longer than one frame period at the predetermined frame rate; and
an image capturing control unit that captures images at the predetermined frame rate under the reference condition, out of the plurality of image capturing conditions, and captures images at a frame rate lower than the predetermined frame rate under the other image capturing conditions, out of the plurality of image capturing conditions, and the playback apparatus comprises:
a playback moving image selection unit that causes a user to select a playback moving image, which is a moving image to be played back, out of a plurality of moving images captured by the image capturing apparatus;
a detection unit that detects a motion between frames of a moving image captured under the reference condition when the image capturing condition of the playback moving image is an image capturing condition other than the reference condition; and
a conversion unit that converts the frame rate of the playback moving image into the predetermined frame rate by generating an interpolation frame for interpolating between frames of the playback moving image based on the motion detected by the detection unit when the image capturing condition of the playback moving image is an image capturing condition other than the reference condition.

2. The moving image playback system according to claim 1, wherein the reference condition selection unit selects an image capturing condition specified by the user, out of the plurality of image capturing conditions to be used for capturing images, as the reference condition.

3. The moving image playback system according to claim 1, wherein
the reference condition selection unit selects as the reference condition one of an image capturing condition with which ISO sensitivity is lowest, an image capturing condition with which angle of view is widest, an image capturing condition with which image quality is highest, and an image capturing condition with which resolution is highest, out of the plurality of image capturing conditions to be used for capturing images.

4. The moving image playback system according to claim 1, wherein the reference condition selection unit selects as the reference condition an image capturing condition with which motion between frames can be detected most accurately, out of the plurality of image capturing conditions to be used for capturing images.

5. The moving image playback system according to claim 4, wherein
a level indicating detection accuracy of motion between frames is predetermined for each of the image capturing conditions, and
the reference condition selection unit selects a condition with which the level is the highest, as the reference condition.

6. The moving image playback system according to claim 4, wherein the plurality of image capturing conditions to be used for capturing images are selected by the user out of a plurality of image capturing conditions that can be set in the image capturing apparatus, and the image capturing apparatus further has an addition unit of adding, when an image capturing condition with which the motion between frames can be detected more accurately than the image capturing conditions selected by the user exists in the image capturing conditions which have not been selected by the user, this image capturing condition to the image capturing conditions to be used for capturing images.

7. An image capturing apparatus that can capture at a predetermined frame rate a plurality of moving images under mutually different image capturing conditions in parallel in use of one image capturing element, the image capturing apparatus comprising:

a reference condition selection unit that selects one of a plurality of image capturing conditions to be used for capturing images as a reference condition when a total of image capturing time of one frame in each image capturing condition to be used for capturing images is longer than one frame period at the predetermined frame rate;

an image capturing control unit that captures images at the predetermined frame rate under the reference condition, out of the plurality of image capturing conditions, and captures images at a frame rate lower than the predetermined frame rate under the other image capturing conditions, out of the plurality of image capturing conditions; and a storage unit that stores a plurality of moving images captured by the image capturing control unit.

8. The image capturing apparatus according to claim 7, wherein the reference condition selection unit selects an image capturing condition specified by the user, out of the plurality of image capturing conditions to be used for capturing images, as the reference condition.

9. The image capturing apparatus according to claim 7, wherein the reference condition selection unit selects as the reference condition one of an image capturing condition with which ISO sensitivity is lowest, an image capturing condition with which angle of view is widest, an image capturing condition with which image quality is highest, and an image capturing condition with which resolution is highest, out of the plurality of image capturing conditions to be used for capturing images.

10. The image capturing apparatus according to claim 7, wherein the reference condition selection unit selects as the reference condition an image capturing condition with which motion between frames can be detected most accurately, out of the plurality of image capturing conditions to be used for capturing images.

11. The image capturing apparatus according to claim 10, wherein a level indicating detection accuracy of motion between frames is predetermined for each of the image capturing conditions, and the reference condition selection unit selects a condition with which the level is the highest, as the reference condition.

12. The image capturing apparatus according to claim 10, wherein the plurality of image capturing conditions to be used for capturing images are selected by the user out of a plurality of image capturing conditions that can be set in the image capturing apparatus, and the image capturing apparatus further has an addition unit of adding, when an image capturing condition with which the motion between frames can be detected more accurately than the image capturing conditions selected by the user exists in the image capturing conditions which have not been selected by the user, this image capturing condition to the image capturing conditions to be used for capturing images.

* * * * *